(12) United States Patent
Chen (10) Patent No.: US 9,335,836 B2
(45) Date of Patent: May 10, 2016

(54) METHOD AND ELECTRONIC APPARATUS FOR REALIZING VIRTUAL HANDWRITING INPUT

(71) Applicant: Huawei Device Co., Ltd., Shenzhen (CN)

(72) Inventor: Chao Chen, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 142 days.

(21) Appl. No.: 14/132,455

(22) Filed: Dec. 18, 2013

(65) Prior Publication Data

US 2014/0104164 A1    Apr. 17, 2014

Related U.S. Application Data

(63) Continuation of application No. PCT/CN2011/076832, filed on Jul. 4, 2011.

(51) Int. Cl.
*G06F 3/041* (2006.01)
*G06F 3/03* (2006.01)
(Continued)

(52) U.S. Cl.
CPC .............. *G06F 3/03* (2013.01); *G06F 3/04883* (2013.01); *G06K 9/00402* (2013.01); *G06K 9/222* (2013.01)

(58) Field of Classification Search
CPC ........... G06F 3/033; G06F 3/02; G06F 3/041; G06F 3/045; G09G 5/08; G09G 5/00; G06K 11/06; G08C 21/00
USPC ..................... 345/173–175; 178/18.01–18.06
See application file for complete search history.

(56) References Cited

U.S. PATENT DOCUMENTS 7,113,174 B1 *   9/2006   Takekawa ............. G06F 3/0421
                                                             178/18.01
7,911,452 B2     3/2011   Kang et al.
(Continued)

FOREIGN PATENT DOCUMENTS

CN          1425150 A      6/2003
CN        101071350 A     11/2007
(Continued)

OTHER PUBLICATIONS

Foreign Communication From a Counterpart Application, European Application No. 11777281.4, Extended European Search Report dated Jul. 8, 2014, 5 pages.
(Continued)

*Primary Examiner* — Pegeman Karimi
(74) *Attorney, Agent, or Firm* — Conley Rose, P.C.; Grant Rodolph; Adam J. Stegge (57) ABSTRACT

The embodiments of the present invention provide a method and an electronic apparatus for realizing virtual handwriting input. The method for realizing virtual handwriting input includes: obtaining, by an electronic apparatus, position coordinates of a handwriting apparatus in a virtual handwriting area through monitoring in a real-time manner, where the virtual handwriting area is an area in which a distance-measuring detector in the electronic apparatus may perform effective distance measurement; obtaining a track formed by the position coordinates, and obtaining a handwriting track of an entire handwriting input process when it is detected that the current handwriting input ends; and identifying a character corresponding to the obtained handwriting track and displaying the identified character. With the embodiments of the present invention, handwriting input may be realized simply and conveniently, and handwriting input may be realized and may be implemented with a low cost.

15 Claims, 6 Drawing Sheets

(51) Int. Cl.
*G06F 3/0488* (2013.01)
*G06K 9/22* (2006.01)
*G06K 9/00* (2006.01)

(56) References Cited

U.S. PATENT DOCUMENTS

| | | | |
|---|---|---|---|
| 8,390,586 B2* | 3/2013 | Kawano | G02B 5/189 345/173 |
| 8,952,906 B2 | 2/2015 | Lee | |
| 2003/0001818 A1* | 1/2003 | Katagiri | G06F 3/0304 345/158 |
| 2006/0221063 A1* | 10/2006 | Ishihara | G06F 3/03545 345/173 |
| 2007/0070045 A1* | 3/2007 | Sung | G06K 9/222 345/173 |
| 2009/0003705 A1* | 1/2009 | Zou | G06K 9/00416 382/187 |
| 2009/0304283 A1 | 12/2009 | Predovic et al. | |
| 2011/0084940 A1 | 4/2011 | Lee | |

FOREIGN PATENT DOCUMENTS

| | | |
|---|---|---|
| CN | 101430632 A | 5/2009 |
| KR | 20040043454 A | 5/2004 |
| KR | 20110008719 A | 1/2011 |

OTHER PUBLICATIONS

Partial English Translation and Abstract of Chinese Patent Application No. CN101430632A, Feb. 10, 2014, 10 pages.
Foreign Communication from a Counterpart Application, PCT Application No. PCT/CN2011/076832, English Translation of International Search Report dated Apr. 5, 2012, 3 pages.
Foreign Communication from a Counterpart Application, PCT Application No. PCT/CN2011/076832, English Translation of Written Opinion dated Apr. 5, 2012, 8 pages.
Foreign Communication From a Counterpart Application, Korean Application No. 10-2013-7034143, Korean Office Action dated Feb. 2, 2015, 5 pages.
Foreign Communication From a Counterpart Application, Korean Application No. 10-2013-7034143, English Translation of Korean Office Action dated Feb. 2, 2015, 3 pages.

* cited by examiner

__METHOD AND ELECTRONIC APPARATUS FOR REALIZING VIRTUAL HANDWRITING INPUT__

CROSS-REFERENCE TO RELATED APPLICATION

This application is a continuation of International Application No. PCT/CN2011/076832, filed on Jul. 4, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of virtual handwriting input technologies, and in particular, to a method and an electronic apparatus for realizing virtual handwriting input.

BACKGROUND

At present, there are mainly two kinds of character input manners for mobile phones, palmtop computers, and the like, that is, handwriting input and keyboard input.

Most existing handwriting input technologies are implemented by setting a type of a touch screen such as a resistance type or a capacitance type, and an implementation process is that: a touch position of a user is detected through a resistance or capacitance variation; after the touch screen controller receives the touch information, the touch screen controller converts the touch information into touch point coordinates and then sends the coordinates to a central processing unit (CPU); and the CPU executes a corresponding character identifying operation.

However, because in the foregoing handwriting inputting technologies for a touch screen, a resistance or capacitance variation needs to be detected to determine position coordinates, the touch screen needs to be made of dedicated materials. For example, a resistance-type touch screen is a four-layer composite glass screen, an inner surface and inter-layer of the touch screen are both coated with a layer of indium tin oxide (ITO), and an outermost layer is a thin silica glass protection layer, so that an existing touch screen has defects that a cost is high, a technique is complicated, and it is more likely to be scraped and damaged. Meanwhile, a problem that the touch screen does not respond occurs when position coordinates are determined by detecting a resistance or capacitance variation, and if the problem that the touch screen does not respond is solved by improving sensitivity, the cost of the touch screen is further increased.

SUMMARY

A technical problem to be solved in embodiments of the present invention is to provide a method and an electronic apparatus for realizing virtual handwriting input, so that handwriting input may be realized simply and conveniently and handwriting input may be realized with a low cost.

To solve the foregoing technical problem, an embodiment of the present invention provides a method for realizing virtual handwriting input, including: obtaining, by an electronic apparatus, position coordinates of a handwriting apparatus in a virtual handwriting area through monitoring in a real-time manner, where the virtual handwriting area is an area in which a distance-measuring detector in the electronic apparatus may perform effective distance measurement; obtaining a track formed by the position coordinates, and obtaining a handwriting track of an entire handwriting input process when it is detected that the current handwriting input ends; and identifying a character corresponding to the obtained handwriting track and displaying the identified character.

Accordingly, an embodiment of the present invention further discloses an electronic apparatus for realizing virtual handwriting input, including: a distance-measuring detector configured to detect a value of a distance between a handwriting apparatus and the distance-measuring detector; a position coordinate obtaining module configured to obtain position coordinates of the handwriting apparatus in a virtual handwriting area through calculation according to the value of the distance, where the virtual handwriting area is an area in which the distance-measuring detector may perform effective distance measurement; a handwriting track generating module configured to obtain a track formed by the position coordinates obtained by the position coordinate obtaining module, and obtain a handwriting track of an entire handwriting input process when it is detected that the current handwriting input ends; an identifying module configured to identify a character corresponding to the handwriting track obtained by the handwriting track generating module; and a displaying module configured to display the character identified by the identifying module.

Implementation of the embodiments of the present invention has the following beneficial effects.

A distance-measuring detector obtains a value of a distance between the distance-measuring detector and a handwriting apparatus, such as a user's finger or a handwriting pen, in a virtual handwriting area through detection; position coordinates of the handwriting apparatus in the virtual handwriting area are obtained through calculation according to the value of the distance and a handwriting track is obtained; and a character corresponding to the handwriting track is identified to obtain a character input by the user for this time in the virtual handwriting area, so that handwriting input is realized conveniently and simply. Meanwhile, a distance-measuring detector with a low cost is used to replace a touch screen that is made of dedicated materials through a complicate technique to realize an operation of the virtual handwriting area, so that an implementation manner of the operation of virtual handwriting area is simpler, thereby further saving a cost.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show only some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The embodiments to be described are only a part rather than all of the embodiments of the present invention. All other embodiments obtained by persons of ordinary skill in the art based on the embodiments of the present invention without creative efforts shall fall within the protection scope of the present invention.

The present invention may be applied to devices such as mobiles phones, palmtop computers, and notebook computers. In the present invention, first a distance-measuring detector generates a virtual handwriting area on the surface of a desk or other objects, where the virtual handwriting area is an area in which a disposed distance-measuring detector may perform effective distance measurement. If a user uses a finger, a pen, or the like as a handwriting apparatus to move in the virtual handwriting area, in the present invention, position coordinates of the handwriting apparatus in the virtual handwriting area are obtained through monitoring in a real-time manner and then a handwriting track is obtained. At last, a character represented by the handwriting track is identified.

Figure 1:
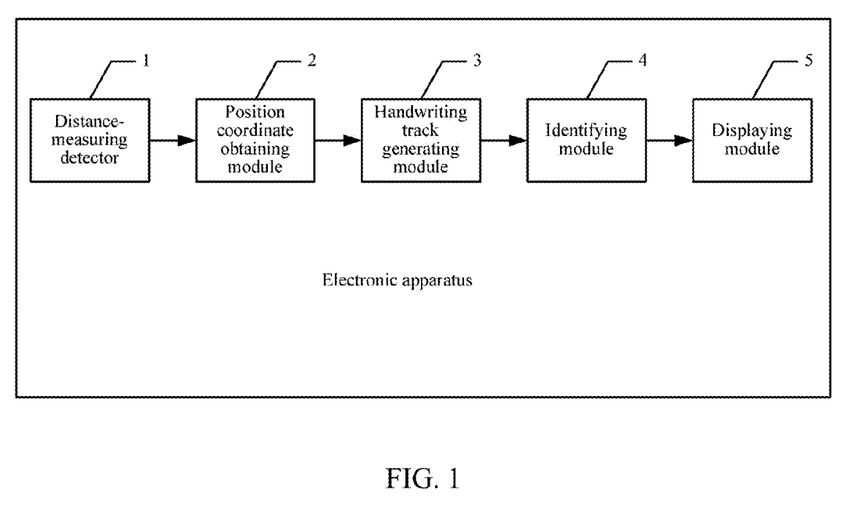
FIG. 1 is a structural composition schematic diagram of an electronic apparatus for realizing virtual handwriting input according to a first embodiment of the present invention.

FIG. 1 is a structural composition schematic diagram of an electronic apparatus capable of realizing virtual handwriting input according to an embodiment of the present invention. The electronic apparatus in this embodiment may be used independently by connecting to a device such as a mobile phone, a palmtop computer, or a notebook computer in a wired manner or a wireless manner such as Bluetooth, and may also be built in a device such as a mobile phone, a palmtop computer, or a notebook computer. The electronic apparatus includes a distance-measuring detector 1, a position coordinate obtaining module 2, a handwriting track generating module 3, an identifying module 4, and a displaying module 5.

The distance-measuring detector 1 is configured to detect a value of a distance from an object within a certain range, such as a finger or a pen serving as a handwriting apparatus, to the distance-measuring detector 1. The detecting range may be a three-dimensional area, and may also be a two-dimensional plane area. In this embodiment, a two-dimensional plane area is taken as an example for description, that is, the two-dimensional plane area is a virtual handwriting area.

When a user uses a handwriting apparatus to enter the area and move in the virtual handwriting area, the distance-measuring detector 1 is capable of obtaining a value of a distance from the handwriting apparatus to the distance-measuring detector 1 in the virtual handwriting area through detection in a real-time manner. The distance-measuring detector 1 may include a first distance-measuring detector and a second distance-measuring detector configured to detect values of distances of the handwriting apparatus at different positions, so that the position coordinate obtaining module 2 obtains position coordinates of the handwriting apparatus in the virtual handwriting area through calculation.

Figure 2:
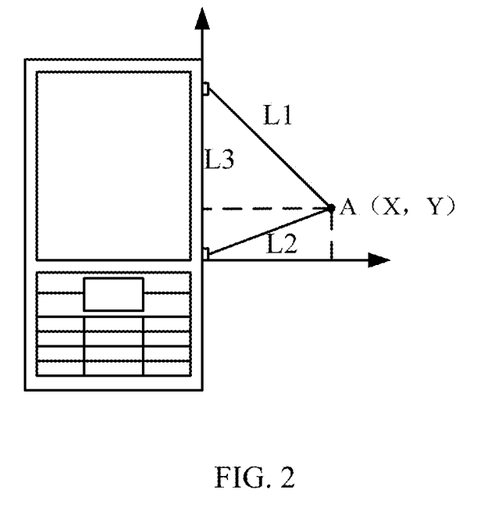
FIG. 2 is a schematic diagram of position coordinates obtained by the electronic apparatus shown in FIG. 1.

The first distance-measuring detector and the second distance-measuring detector in this embodiment are disposed on the right side of a mobile phone, and the virtual handwriting area is a range area in which the first distance-measuring detector and the second distance-measuring detector may perform effective distance detection in a two-dimensional plane where the mobile phone plane is located, specifically as shown in FIG. 2. Definitely, the first distance-measuring detector and the second distance-measuring detector may also be disposed at other positions of the mobile phone, but it is required that the first distance-measuring detector and the second distance-measuring detector can both detect a value of a distance of the handwriting apparatus at the same time.

In addition, a color light illumination manner may also be set to display the virtual handwriting area to a user, so that it is convenient for the user to perform writing.

The position coordinate obtaining module 2 is configured to obtain the position coordinates of the handwriting apparatus in the virtual handwriting area through calculation.

Specifically, the first distance-measuring detector detects a distance between the first distance-measuring detector and the handwriting apparatus in the virtual handwriting area to obtain a first distance value; the second distance-measuring detector detects a distance between the second distance-measuring detector and the handwriting apparatus in the virtual handwriting area to obtain a second distance value; and the position coordinate obtaining module 2 obtains the position coordinates of the handwriting apparatus in the virtual handwriting area through calculation according to the first distance value, the second distance value, and a preset value of a distance between the first distance-measuring detector and the second distance-measuring detector.

For example, FIG. 2 is a schematic diagram of position coordinates obtained by the electronic apparatus shown in FIG. 1, a connecting line between the two distance-measuring detectors serves as a Y-axis, one of the distance-measuring detectors serves as an origin, and a straight line that is perpendicular to the Y-axis and passes through the origin serves as an X-axis. As shown in the figure, it is assumed that a handwriting apparatus A is currently located at a position of coordinates (X, Y), the distance between the first distance-measuring detector and the handwriting apparatus in the virtual handwriting area obtained by the first distance-measuring detector is a first distance value L1, the distance between the second distance-measuring detector and the handwriting apparatus in the virtual handwriting area obtained by the second distance-measuring detector is a second distance value L2, and the distance between the first distance-measuring detector and the second distance-measuring detector is a distance value L3, where the distance value L3 has been determined before handwriting input by a user (or has been determined when leaving the factory) and is preset in the position coordinate obtaining module 2 of the electronic apparatus. The position coordinate obtaining module 2 may obtain, according to the L1, the L2, and the L3, and in combination with a related triangle calculation formula, position coordinates of the handwriting apparatus in the virtual handwriting area at different time points during a process that a user uses the handwriting apparatus to perform writing.

Definitely, the connecting line between the two distance-measuring detectors may serve as a Y-axis, and the perpendicular bisector of the connecting line between the two distance-measuring detectors may serve as an X-axis to establish a coordinate system. In the embodiment of the present invention, establishment of a coordinate system is not limited.

The handwriting track generating module 3 is configured to obtain a track formed by the position coordinates obtained by the position coordinate obtaining module 2, and obtain a handwriting track of an entire handwriting input process when it is detected that the current handwriting input ends.

Specifically, the handwriting track generating module 3 may connect continuous position coordinates obtained by the position coordinate obtaining module 2 and generate, in a real-time manner, a track written by a user through the handwriting apparatus. When the position coordinate obtaining module 2 is incapable of detecting new position coordinates, which results in discontinuity of position coordinates, for example, after the user finishes a first stroke of a certain character and starts to write a next stroke of the character, the handwriting track generating module 3 records a track that has already been generated and the recorded track is displayed by the displaying module 5. When the position coordinate obtaining module 2 obtains continuous position coordinates again, the handwriting track generating module 3 executes the foregoing step repeatedly until the handwriting input for this time ends. After it is determined that the input for this time ends, one or multiple tracks recorded by the handwriting track generating module 3 form a handwriting track of the handwriting input for this time.

A manner for the handwriting track generating module 3 to obtain a handwriting track may also be: the handwriting track generating module 3 may connect, when a preset time interval such as 0.1 seconds (s) arrives, all position coordinates obtained by the position coordinate obtaining module 2 within the 0.1 s to generate a handwriting track written by a user by using the handwriting apparatus within the 0.1 s, and may further notify the displaying module 5 to synchronously display the track within the 0.1 s. When the user continuously moves the handwriting apparatus to perform writing, the handwriting track generating module 3 continues, according to position coordinates obtained by the position coordinate obtaining module 2, to generate handwriting tracks within multiple time intervals of 0.1 s, and the handwriting tracks may be continuously displayed by the displaying module 5 to the user for check until it is detected that the current handwriting input ends. When the handwriting input ends, the obtained and displayed tracks within the plurality of time intervals of 0.1 s are combined to form a handwriting track of the handwriting for this time.

The manner for the handwriting track generating module 3 to obtain a handwriting track may also be: set a first time threshold and a second time threshold, where the second time threshold is greater than the first time threshold. The handwriting track generating module 3 connects multiple position coordinates obtained by the position coordinate obtaining module 2 to generate and record in real-time a handwriting track written by a user by using the handwriting apparatus. When a time interval from a moment that the position coordinate obtaining module 2 cannot obtain position coordinates to a moment that the position coordinate obtaining module 2 obtains new position coordinates does not reach the first time threshold, the handwriting track generating module 3 continues to generate and record a new track; and when the time interval from the moment that the position coordinate obtaining module 2 cannot obtain position coordinates to the moment that the position coordinate obtaining module 2 obtains new position coordinates reaches the second time threshold, the handwriting track generating module 3 determines that the handwriting input ends. One or multiple tracks recorded by the handwriting track generating module 3 form a handwriting track.

Manners for the handwriting track generating module 3 to detect and determine whether the handwriting for this time ends are multiple. For example, it is detected that the position coordinate obtaining module 2 cannot continuously obtain position coordinates of the handwriting apparatus in the virtual handwriting area for 3 s; or for example, the user has determined, through an operation such as key-pressing, that the handwriting input for this time ends.

The identifying module 4 is configured to identify a character corresponding to the handwriting track obtained by the handwriting track generating module 3.

After the handwriting track generating module 3 obtains an entire handwriting track, the identifying module 4 obtains the entire handwriting track by using an existing character identifying algorithm; or searches, through the handwriting track, a locally stored character data base for a character matching the handwriting track, and uses the character as the character corresponding to the handwriting track.

The displaying module 5 is configured to display the character identified by the identifying module 4.

The identifying module 4 may accurately identify and obtain a character corresponding to the handwriting track, and uses the character as a character written by the user for this time, and the character is displayed through the displaying module 5 in a corresponding position, for example, in a text message. Definitely, the identifying module 4 may also use a related-identification manner to identify multiple characters that match and are related to the handwriting track, then the plurality of characters are displayed by the displaying module 5 in a character displaying area for the user to select a required character, and at last, the displaying module 5 displays the character selected by the user in a corresponding position, for example, in a text message.

Implementation of the embodiment of the present invention has the following beneficial effects.

A distance-measuring detector obtains a value of a distance between the distance-measuring detector and a handwriting apparatus, such as a user's finger or a handwriting pen, in a virtual handwriting area through detection, position coordinates of the handwriting apparatus in the virtual handwriting area are obtained through calculation according to the value of the distance and a handwriting track is obtained; and a character corresponding to the handwriting track is identified to obtain a character input by the user for this time in the virtual handwriting area, so that handwriting input is realized conveniently and simply. Meanwhile, a distance-measuring detector with a low cost is used to replace a touch screen that is made of dedicated materials through a complicate technique to realize an operation of the virtual handwriting area, so that an implementation manner of the operation of the virtual handwriting area is simpler, thereby further saving a cost.

Figure 3:
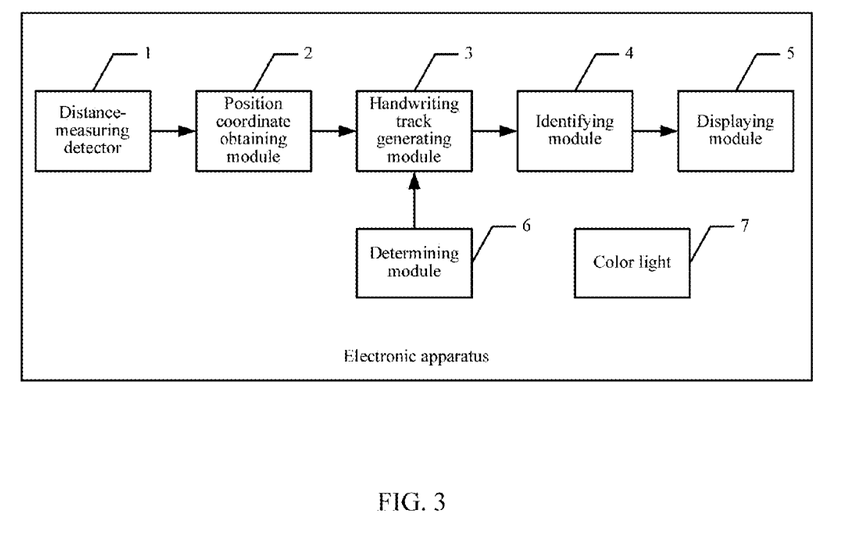
FIG. 3 is a structural composition schematic diagram of an electronic apparatus for realizing virtual handwriting input according to a second embodiment of the present invention.

Further, FIG. 3 is a structural composition schematic diagram of an electronic apparatus capable of realizing virtual handwriting input according a second embodiment of the present invention. The electronic apparatus in this embodiment is built in a mobile phone and the electronic apparatus includes the distance-measuring detector 1, the position coordinate obtaining module 2, the handwriting track generating module 3, the identifying module 4, and the displaying module 5 that are provided in the first embodiment of the electronic apparatus, and further includes a determining module 6.

The determining module 6 is configured to determine whether a time interval that the position coordinate obtaining module 2 does not obtain position coordinates of a handwriting apparatus in a virtual handwriting area reaches a preset threshold, and if yes, determine that the current handwriting input ends and notify the handwriting track generating module 3 to obtain a handwriting track of an entire handwriting input process; or configured to determine whether a key-pressing operation indicating that the handwriting input ends is received, and if yes, determine that the current handwriting input ends and notify the handwriting track generating module to obtain a handwriting track of an entire handwriting input process.

Specifically, when a user stops performing writing or lifts a handwriting apparatus, such as a pen or a finger, in the virtual writing area, an optical sensor in the position coordinate obtaining module 2 cannot obtain a reflected infrared ray, so that the position coordinate obtaining module 2 cannot obtain position coordinates of the writing apparatus in the virtual handwriting area. When the time interval that the position coordinate obtaining module 2 does not obtain the position coordinates of the handwriting apparatus in the virtual handwriting area reaches 3 s, the determining module 6 connected to the position coordinate obtaining module 2 may determine that the user lifts the pen and the current handwriting input ends, and may notify the handwriting track generating module 3 connected to the determining module 6 to obtain the handwriting track of the entire handwriting input process.

Figure 4:
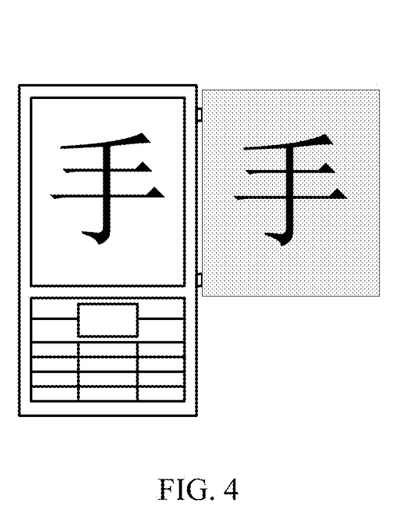
FIG. 4 is a schematic diagram of a using effect that the electronic apparatus shown in FIG. 3 is applied in a mobile phone.

Further, as shown in FIG. 3, the electronic apparatus may further include:

A color light 7 is configured to display an effective range of the virtual handwriting area by giving off light. A function of the color light lies in that, a lighting color can be adjusted according to a user requirement, so that a virtual handwriting area covered by the infrared ray can be displayed to the user in color required by the user. Reference is made to FIG. 4 for a specific effect. FIG. 4 is a schematic diagram of a using effect that the electronic apparatus shown in FIG. 3 is applied in a mobile phone. There may be multiple color lights 7, which may be located in the same position as the distance-measuring detector 1 correspondingly.

In addition, the position coordinate obtaining module 2, the handwriting track generating module 3, and the identifying module 4 may be built in a digital processing chip, and the digital processing chip processes various data to realize a corresponding function.

According to the description of the foregoing embodiment, the present invention has the following beneficial effects.

A distance-measuring detector obtains a value of a distance between the distance-measuring detector and a handwriting apparatus, such as a user's finger or a handwriting pen, in a virtual handwriting area through detection; position coordinates of the handwriting apparatus in the virtual handwriting area are obtained through calculation according to the value of the distance and a handwriting track is obtained; and a character corresponding to the handwriting track is identified to obtain a character input by the user for this time in the virtual handwriting area, so that handwriting input is realized conveniently and simply. Meanwhile, a distance-measuring detector with a low cost is used to replace a touch screen that is made of dedicated materials through a complicate technique to realize an operation of the virtual handwriting area, so that an implementation manner of the operation of the virtual handwriting area is simpler, thereby further saving a cost. In addition, an effective virtual handwriting area may further be displayed to the user by using a color light with adjustable color, so that the user performs handwriting input better, and furthermore, an individualized requirement of the user is satisfied.

The following describes a method for realizing virtual handwriting input according to the present invention in detail.

Figure 5:
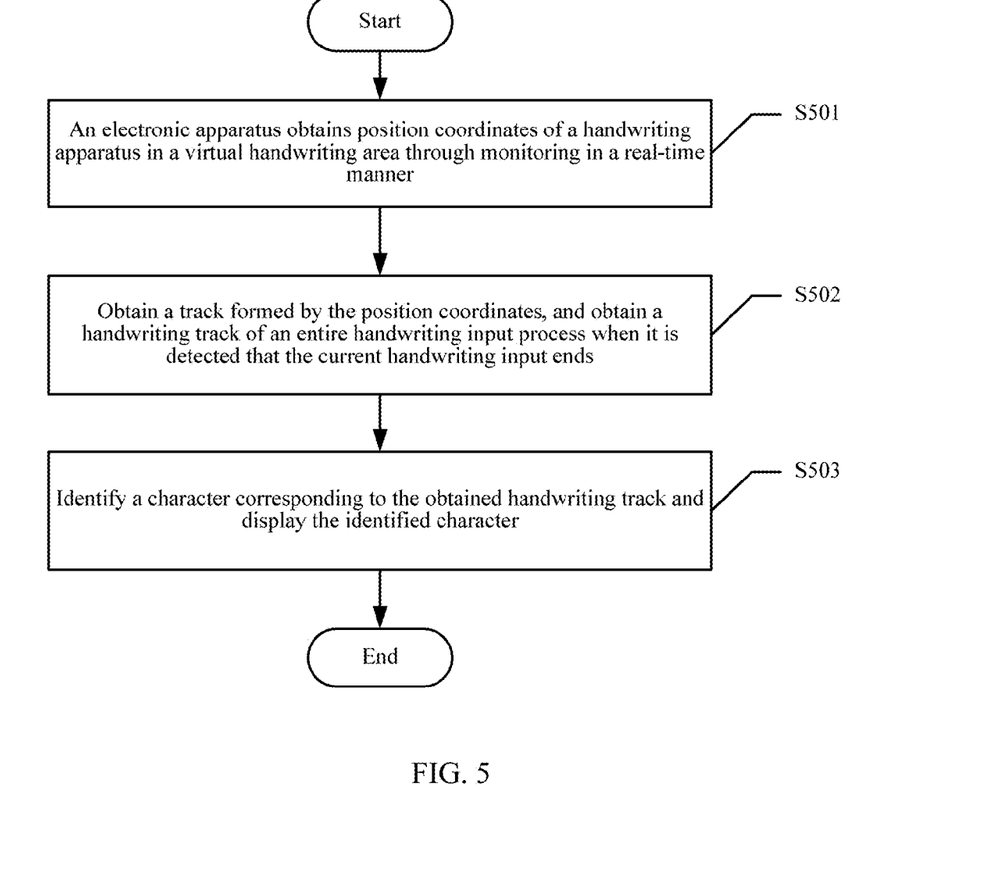
FIG. 5 is a flowchart of a method for realizing virtual handwriting input according to a first embodiment of the present invention.

FIG. 5 is a flowchart of a method for realizing virtual handwriting input according to a first embodiment of the present invention. The method specifically includes:

S501: An electronic apparatus obtains position coordinates of a handwriting apparatus in a virtual handwriting area through monitoring in a real-time manner, where the virtual handwriting area is an area in which a distance-measuring detector in the electronic apparatus may perform effective distance measurement.

Specifically, the distance-measuring detector is configured to detect a value of a distance from an object within a certain range, such as a finger or a pen serving as a handwriting apparatus, to the distance-measuring detector. The detecting range may be a three-dimensional area, and may also be a two-dimensional plane area. In this embodiment, a two-dimensional plane area is taken as an example for description, that is, the two-dimensional plane area is a virtual handwriting area.

When a user uses a handwriting apparatus to enter the area and move in the virtual handwriting area, the distance-measuring detector is capable of obtaining a value of a distance from the handwriting apparatus to the distance-measuring detector in the virtual handwriting area through detection in a real-time manner. The distance-measuring detector may include a first distance-measuring detector and a second distance-measuring detector, which are located in different positions for detecting a value of a distance, so that position coordinates of the handwriting apparatus in the virtual handwriting area are obtained through calculation subsequently.

The first distance-measuring detector and the second distance-measuring detector may be disposed on the right side of a mobile phone, and the virtual handwriting area is a range area in which the first distance-measuring detector and the second distance-measuring detector may perform effective distance detection in a two-dimensional plane where the mobile phone plane is located. Definitely, the first distance-measuring detector and the second distance-measuring detector may also be disposed at other positions of the mobile phone, but it is required that the first distance-measuring detector and the second distance-measuring detector can both detect a value of a distance of the handwriting apparatus at the same time.

The first distance-measuring detector detects a distance between the first distance-measuring detector and the handwriting apparatus in the virtual handwriting area to obtain a first distance value; the second distance-measuring detector detects a distance between the second distance-measuring detector and the handwriting apparatus in the virtual handwriting area to obtain a second distance value; and in S501, the position coordinates of the handwriting apparatus in the virtual handwriting area may be obtained through calculation according to the first distance value, the second distance value, and a preset value of a distance between the first distance-measuring detector and the second distance-measuring detector, and in combination with a related triangle calculation formula.

In addition, a color light illumination manner may also be set to display the virtual handwriting area to a user, so that it is convenient for the user to perform writing.

Step 502: Obtain a track formed by the position coordinates, and obtain a handwriting track of an entire handwriting input process when it is detected that the current handwriting input ends.

Specifically, in S502, continuous position coordinates obtained in S501 may be connected to generate, in a real-time manner, a track written by a user through the handwriting apparatus. When new position coordinates cannot be detected, which results in discontinuity of position coordinates, for example, after the user finishes a first stroke of a certain character and starts to write a next stroke of the character, a track that has already been generated is recorded; and when continuous position coordinates are obtained again, a track that has already been generated is recorded again until the handwriting input for this time ends. After it is determined that the input for this time ends, one or multiple tracks recorded in S502 form a handwriting track of the handwriting input for this time.

The step for obtaining the handwriting track in the entire handwriting input process may also be: when a preset time interval such as 0.1 s arrives, all position coordinates obtained within the 0.1 s may be connected to generate a handwriting track written by a user by using the handwriting apparatus within the 0.1 s, and the track within the 0.1 s may be synchronously displayed by using a display of a device such as a mobile phone. When the user continuously moves the handwriting apparatus to perform writing, tracks in multiple time intervals of 0.1 s are continued to be generated according to position coordinates obtained in a real-time manner, and the tracks may be continuously displayed by using a display of a device such as a mobile phone to the user for check until it is detected that the current handwriting input ends. The tracks within the plurality of time intervals (such as 0.1 s) obtained and displayed after the handwriting input ends are combined to form a handwriting track of the handwriting for this time.

The step for obtaining the handwriting track in the entire handwriting input process may also be: a first time threshold and a second time threshold are preset, where the second time threshold is greater than the first time threshold; multiple obtained position coordinates are connected to generate and record in real-time a handwriting track written by a user by using the handwriting apparatus. When a time interval from a moment that position coordinates cannot be obtained to a moment that new position coordinates are obtained does not reach the first time threshold, a track is continued to be generated and recorded; and when the time interval from the moment that the position coordinates cannot be obtained to the moment that new position coordinates are obtained reaches the second time threshold, it is determined that the handwriting input ends. One or multiple recorded tracks form a handwriting track.

Manners for detecting and determining whether the handwriting for this time ends in S502 are multiple. For example, when it is detected that the position coordinate obtaining module 2 cannot continuously obtain position coordinates of the handwriting apparatus in the virtual handwriting area for 3 s, it may be determined that the handwriting ends; or for example, when the user has determined, through an operation such as key-pressing, that the handwriting input for this time ends, it may be determined that the handwriting ends.

Step 503: Identify a character corresponding to the obtained handwriting track and display the identified character.

Specifically, after an entire handwriting track is obtained in S502, the entire handwriting track may be obtained in S503 by using an existing character identifying algorithm; or a locally stored character data base is searched, through the handwriting track, for a character matching the handwriting track, and the character is used as the character corresponding to the handwriting track.

In S503, a character corresponding to the handwriting track may be accurately identified and obtained, and the character is used as a character written by the user for this time, and the character is displayed through a displaying module in a corresponding position, for example, in a text message. Definitely, in S503, a related-identification manner may also be used to identify multiple characters that match and are related to the handwriting track, then the plurality of characters are displayed by the displaying module in a character displaying area for the user to select a required character, and at last, the displaying module displays the character selected by the user in a corresponding position, for example, in a text message.

Implementation of the embodiment of the present invention has the following beneficial effects.

A distance-measuring detector obtains a value of a distance between the distance-measuring detector and a handwriting apparatus, such as a user's finger or a handwriting pen, in a virtual handwriting area through detection, position coordinates of the handwriting apparatus in the virtual handwriting area are obtained through calculation according to the value of the distance and a handwriting track is obtained; and a character corresponding to the handwriting track is identified to obtain a character input by the user for this time in the virtual handwriting area, so that handwriting input is realized conveniently and simply. Meanwhile, a distance-measuring detector with a low cost is used to replace a touch screen that is made of dedicated materials through a complicated technique to realize an operation of the virtual handwriting area, so that an implementation manner of the operation of the virtual handwriting area is simpler, thereby further saving a cost.

Figure 6:
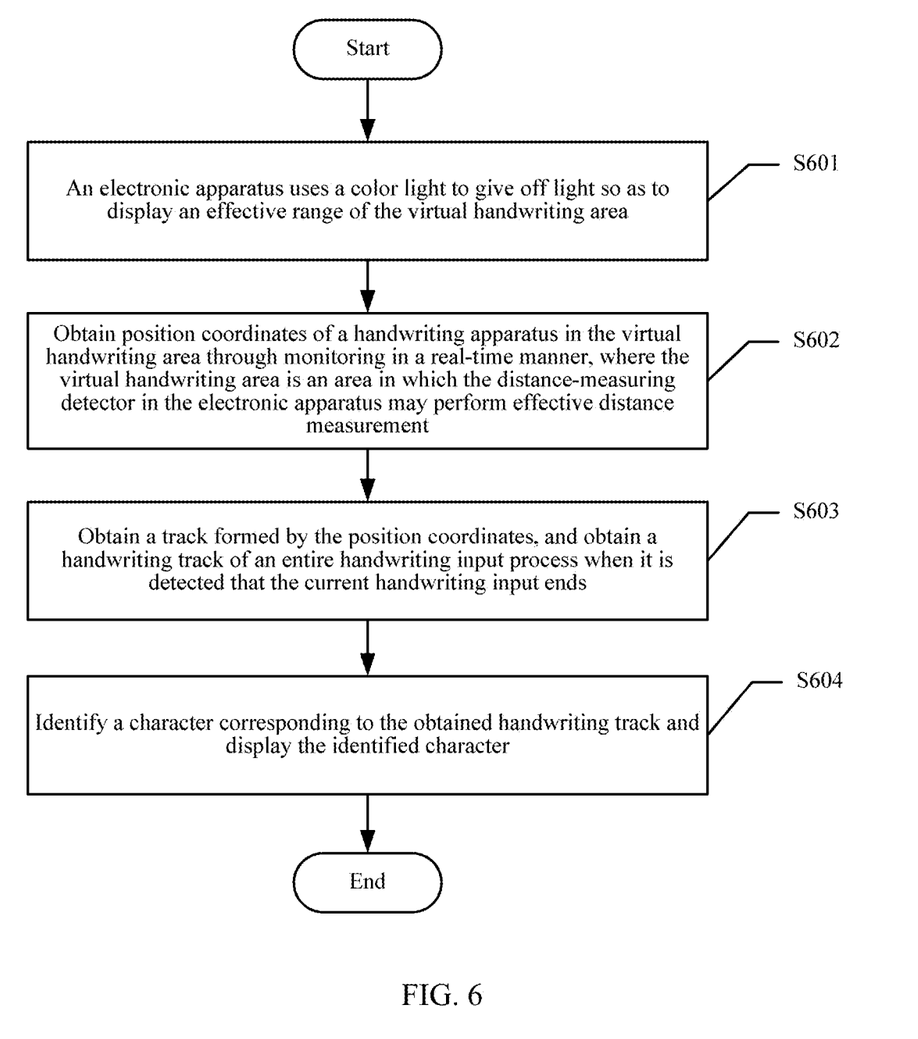
FIG. 6 is a flowchart of a method for realizing virtual handwriting input according to a second embodiment of the present invention.

FIG. 6 is a flowchart of a method for realizing virtual handwriting input according to a second embodiment of the present invention. The method specifically includes:

S601: An electronic apparatus uses a color light to give off light so as to display an effective range of a virtual handwriting area.

In this embodiment, a distance-measuring detector of the electronic apparatus is disposed on the right side of a mobile phone, and the color light is disposed on the same side as the distance-measuring detector, so that an effective range of a virtual handwriting area is displayed to a user.

In this step, a virtual handwriting area formed by coverage of the distance-measuring detector may be displayed to a user, so that the user obviously knows an effective range of the virtual handwriting area. A lighting color of the color light is adjustable, so that the user may adjust the lighting color of the color light as required to realize an individualized virtual handwriting area.

S602: Obtain position coordinates of a handwriting apparatus in the virtual handwriting area through monitoring in a real-time manner, where the virtual handwriting area is an area in which the distance-measuring detector in the electronic apparatus may perform effective distance measurement.

The distance-measuring detector in the electronic apparatus includes a first distance-measuring detector and a second distance-measuring detector. S602 may specifically include: the first distance-measuring detector detects a distance between the first distance-measuring detector and the handwriting apparatus in the virtual handwriting area to obtain a first distance value; the second distance-measuring detector detects a distance between the second distance-measuring detector and the handwriting apparatus in the virtual handwriting area to obtain a second distance value; and the position coordinates of the handwriting apparatus in the virtual handwriting area are obtained through calculation according to the first distance value, the second distance value, and a preset value of a distance between the first distance-measuring detector and the second distance-measuring detector.

S603: Obtain a track formed by the position coordinates, and obtain a handwriting track of an entire handwriting input process when it is detected that the current handwriting input ends.

Manner for detecting whether the current handwriting input ends may specifically include: determining whether a time interval that position coordinates of the handwriting apparatus in the virtual handwriting area are not obtained reaches a preset threshold, if yes, determining that the current handwriting input ends; otherwise, continuing to obtain a track formed by the position coordinates; or determining whether a key-pressing operation indicating that the handwriting input ends is received, and if yes, determining that the current handwriting input ends; otherwise, continuing to obtain a track formed by the position coordinates.

S604: Identify a character corresponding to the obtained handwriting track and display the identified character.

The identified and obtained character corresponding to the handwriting track may include one or multiple. The one or multiple identified characters that are displayed are used for a user to select and determine a character of the handwriting input for this time.

Implementation of the embodiment of the present invention has the following beneficial effects.

A distance-measuring detector obtains a value of a distance between the distance-measuring detector and a handwriting apparatus, such as a user's finger or a handwriting pen, in a virtual handwriting area through detection, position coordinates of the handwriting apparatus in the virtual handwriting area are obtained through calculation according to the value of the distance and a handwriting track is obtained; and a character corresponding to the handwriting track is identified to obtain a character input by the user for this time in the virtual handwriting area, so that handwriting input is realized conveniently and simply. Meanwhile, a distance-measuring detector with a low cost is used to replace a touch screen that is made of dedicated materials through a complicated technique to realize an operation of the virtual handwriting area, so that an implementation manner of the operation of the virtual handwriting area is simpler, thereby further saving a cost. In addition, an effective virtual handwriting area may further be displayed to the user by using a color light with adjustable color, so that the user performs handwriting input better, and furthermore, an individualized requirement of the user is satisfied.

Persons of ordinary skill in the art may understand that all or a part of the procedures of the methods in the foregoing embodiments may be implemented by a computer program instructing relevant hardware. The program may be stored in a computer readable storage medium. When the program is run, the procedures of the methods in the foregoing embodiments are performed. The storage medium may be a magnetic disk, an optical disk, a read-only memory (ROM), a random access memory (RAM), or the like.

The foregoing disclosed are only exemplary embodiments of the present invention, but are not intended to limit the scope of the claims of the present invention. Therefore, equivalent variations made according to the claims of the present invention shall fall within the scope covered by the present invention.

What is claimed is:

1. A method for realizing virtual handwriting input, comprising:
    obtaining, by an electronic apparatus, position coordinates of a handwriting apparatus in a virtual handwriting area through monitoring in a real-time manner, wherein the virtual handwriting area is an area in which a first distance-measuring detector and a second distance-measuring detector in the electronic apparatus are configured to perform distance measurement;
    detecting, by the first distance-measuring detector, a distance between the first distance-measuring detector and the handwriting apparatus in the virtual handwriting area to obtain a first distance value;
    detecting, by the second distance-measuring detector, a distance between the second distance-measuring detector and the handwriting apparatus in the virtual handwriting area to obtain a second distance value;
    obtaining the position coordinates of the handwriting apparatus in the virtual handwriting area through calculation according to the first distance value, the second distance value, and a value of a distance between the first distance-measuring detector and the second distance-measuring detector;
    obtaining a track formed by the position coordinates;
    obtaining a handwriting track of an entire handwriting input process when it is detected that a current handwriting input ends;
    identifying a character corresponding to the obtained handwriting track; and
    displaying the identified character.

2. The method according to claim 1, wherein detecting whether the current handwriting input ends, comprises:
    determining whether a time interval that position coordinates of the handwriting apparatus in the virtual handwriting area are not obtained reaches a preset threshold; and
    determining that the current handwriting input ends when the time interval reaches the preset threshold.

3. The method according to claim 1, wherein before obtaining the position coordinates of the handwriting apparatus in the virtual handwriting area through monitoring in the real-time manner, the method further comprises displaying an effective range of the virtual handwriting area by giving off light through a color light.

4. The method according to claim 3, wherein the identified and obtained character corresponding to the handwriting track includes one or multiple identified characters, and wherein the one or multiple identified characters that are displayed are used for a user to select and determine a character of the handwriting input.

5. The method according to claim 1, wherein detecting whether the current handwriting input ends, comprises:
    determining whether a key-pressing operation indicating that the current handwriting input ends is received; and
    determining that the current handwriting input ends when the key-pressing operation is received.

6. An electronic apparatus capable of realizing virtual handwriting input, comprising:
    a first distance-measuring detector configured to detect a value of a first distance between a handwriting apparatus and the first distance-measuring detector in a virtual handwriting area to obtain a first distance value;
    a second distance-measuring detector configured to detect a value of a second distance between the handwriting apparatus and the second distance-measuring detector in the virtual handwriting area to obtain a second distance value;

a position coordinate obtaining module configured to obtain position coordinates of the handwriting apparatus in the virtual handwriting area through calculation according to the first distance value, the second distance value, and a value of a distance between the first distance-measuring detector and the second distance-measuring detector, wherein the virtual handwriting area is an area in which the first distance-measuring detector and the second distance-measuring detector are configured to perform distance measurement;

a handwriting track generating module configured to obtain a track formed by the position coordinates obtained by the position coordinate obtaining module, and obtain a handwriting track of an entire handwriting input process when it is detected that the current handwriting input ends;

an identifying module configured to identify a character corresponding to the handwriting track obtained by the handwriting track generating module; and a displaying module configured to display the character identified by the identifying module.

7. The electronic apparatus according to claim 6, further comprising:
a determining module configured to:
determine whether a time interval that the position coordinate obtaining module does not obtain position coordinates of the handwriting apparatus in the virtual handwriting area reaches a preset threshold; and
determine that the current handwriting input ends and notify the handwriting track generating module to obtain the handwriting track of the entire handwriting input process when the time interval reaches the preset threshold.

8. The electronic apparatus according to claim 6, further comprising a color light configured to display an effective range of the virtual handwriting area by giving off light.

9. The electronic apparatus according to claim 8, wherein the character identified and obtained by the identifying module and corresponding to the handwriting track includes one or multiple identified characters, and wherein the one or multiple identified characters displayed by the displaying module are used for a user to determine and select a character of the handwriting input.

10. The electronic apparatus according to claim 6, further comprising:
a determining module configured to:
determine whether a key-pressing operation indicating that the current handwriting input ends is received; and
determine that the current handwriting input ends and notify the handwriting track generating module to obtain the handwriting track of the entire handwriting input process when the key-pressing operation is received.

11. A non-transitory computer-readable medium having computer usable instructions stored thereon for execution by a processor, wherein the instructions cause the processor to:
obtain, by an electronic apparatus, position coordinates of a handwriting apparatus in a virtual handwriting area through monitoring in a real-time manner, wherein the virtual handwriting area is an area in which a first distance-measuring detector and a second distance-measuring detector in the electronic apparatus are configured to perform distance measurement;
detect, by the first distance-measuring detector, a distance between the first distance-measuring detector and the handwriting apparatus in the virtual handwriting area to obtain a first distance value;
detect, by the distance-measuring detector, a distance between the second distance-measuring detector and the handwriting apparatus in the virtual handwriting area to obtain a second distance value;
obtain the position coordinates of the handwriting apparatus in the virtual handwriting area through calculation according to the first distance value, the second distance value, and a value of a distance between the first distance-measuring detector and the second distance-measuring detector;
obtain a track formed by the position coordinates;
obtain a handwriting track of an entire handwriting input process when it is detected that the current handwriting input ends;
identify a character corresponding to the obtained handwriting track; and
display the identified character.

12. The non-transitory computer readable medium of claim 11, wherein the instructions cause the processor to detect whether the current handwriting input ends, comprises the instructions causing the processor to determine whether a time interval that position coordinates of the handwriting apparatus in the virtual handwriting area are not obtained reaches a preset threshold, and determine that the current handwriting input ends when the time interval reaches the preset threshold.

13. The non-transitory computer readable medium of claim 11, wherein the instructions cause the processor to detect whether the current handwriting input ends, comprises the instructions causing the processor to determine whether a key-pressing operation indicating that the current handwriting input ends is received, and determine that the current handwriting input ends when the key-pressing operation is received.

14. The non-transitory computer readable medium of claim 11, wherein the instructions cause the processor to display an effective range of the virtual handwriting area by giving off light through a color light.

15. The non-transitory computer readable medium of claim 11, wherein the identified and obtained character corresponding to the handwriting track includes one or multiple identified characters, and wherein the one or multiple identified characters that are displayed are used for a user to select and determine a character of the handwriting input.

* * * * *